Oct. 17, 1967   W. H. ROYER   3,347,182
DOUBLE LAP OVEN HEATING SYSTEM
Filed Sept. 30, 1965   6 Sheets-Sheet 1

Fig. 1a

INVENTOR.
WAYNE H. ROYER
BY
Otto Mueller

Fig. 1b

INVENTOR.
WAYNE H. ROYER
BY
Otto Moeller

Oct. 17, 1967   W. H. ROYER   3,347,182
DOUBLE LAP OVEN HEATING SYSTEM
Filed Sept. 30, 1965   6 Sheets-Sheet 3

INVENTOR.
WAYNE H. ROYER
BY
Otto Moeller

INVENTOR.
WAYNE H. ROYER
BY Otto Moeller

United States Patent Office 3,347,182
Patented Oct. 17, 1967

3,347,182
DOUBLE LAP OVEN HEATING SYSTEM
Wayne H. Royer, York, Pa., assignor to Read Corporation, York, Pa., a corporation of Delaware
Filed Sept. 30, 1965, Ser. No. 491,614
8 Claims. (Cl. 107—57)

This invention relates to baking chamber atmosphere recirculating systems for commercial double lap baking ovens.

In such ovens the products to be baked are transported through the oven on trays of an endless conveyor that runs rearwardly and forwardly through the oven in two laps having four superposed vertically spaced horizontal runs interconnected at their ends. Heating means, in the form of direct fired fluid fuel burners or indirect fired heating flues, are disposed beneath each of the runs of the products through the oven.

In baking various kinds of cakes, pies, rolls and breads, different baking conditions are required in different baking zones of the oven to obtain baked products of high quality, and it is an object of this invention to provide in an oven of the above type novel forced baking chamber atmosphere recirculating means wherein controlled recirculation is provided for in different heating zones associated with the plurality of tray conveyor runs.

A further object is to provide a novel construction and arrangement of forced baking chamber atmosphere recirculating means for a double lap oven providing for independent control of recirculation through longitudinally contiguous heating zones embracing the portions of the tray conveyor runs in the forward portion of the oven and the portions of the tray conveyor runs in the rearward portion of the oven, and wherein recirculated oven atmosphere is selectively discharged in an upward or downward direction in one or more zones independently of the direction of discharge of recirculated oven atmosphere in the other zones of the oven, whereby to provide in the various zones of the oven optimum conditions for baking specific types of products.

Other objects and advantages reside in certain novel features of the construction, arrangement and combination of parts as will become apparent from the following description, reference being had to the accompanying drawings, in which:

FIGURE 2 is sectional view taken on line 2—2 of FIGURE 1a;

FIGURE 5 is a sectional view taken on line 5—5 of FIGURE 1a;

The double lap oven illustrated in the drawings is in the form of a longitudinally elongated housing 10, generally rectangular in shape, defined by a top wall 12, a front wall 14, a rear wall 16, side walls 18 and 20, and a base wall 22. The walls are formed by spaced inner and outer sheets between which is interposed suitable heat insulating material, designated by reference numeral 24.

Figure 1A:
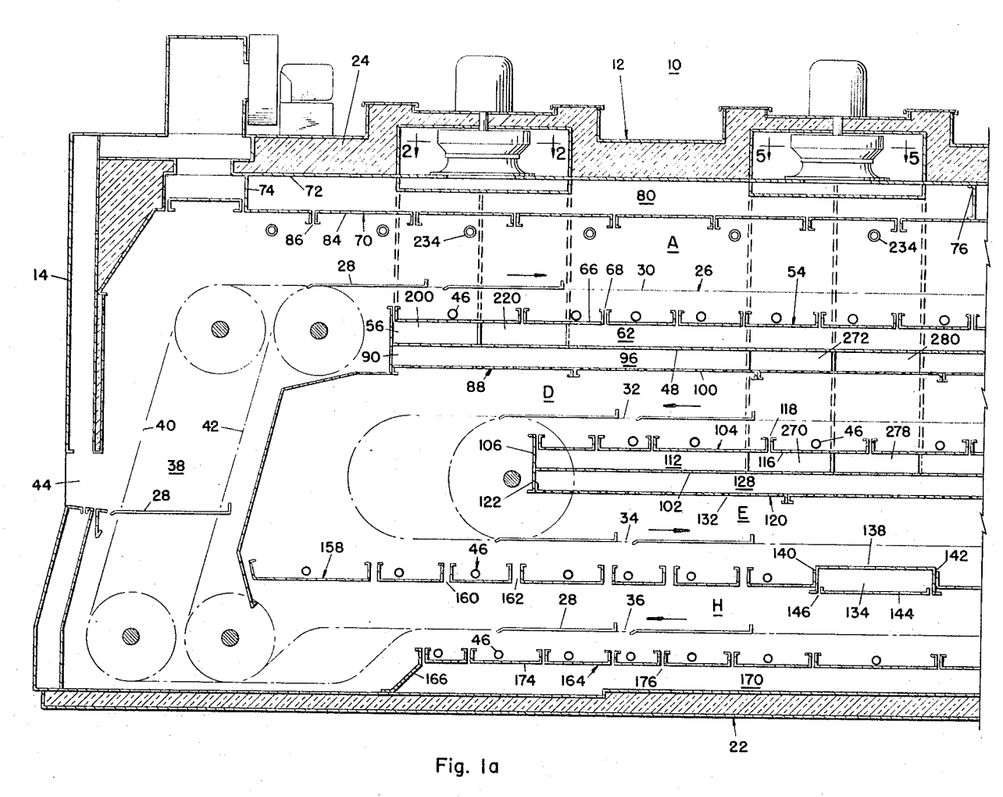
FIGURES 1a and 1b are longitudinal vertical sectional views respectively of the forward and rearward portions of a baking oven embodying the present invention, with parts being shown in elevation.
Figure 1B:
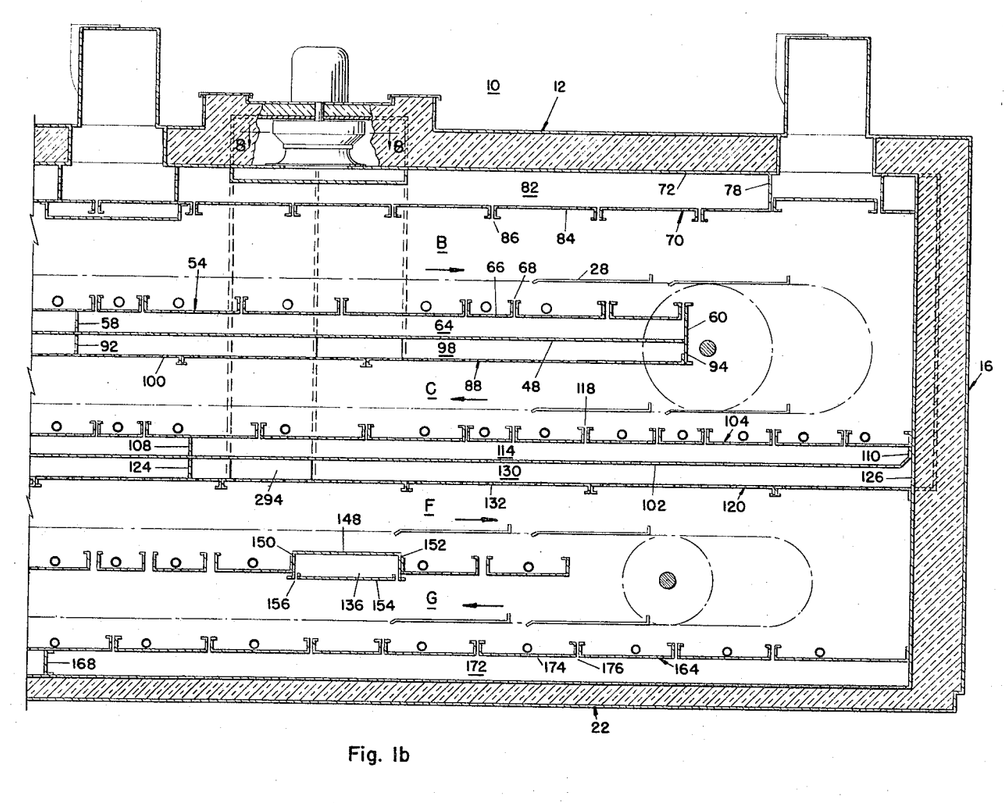

In the double lap oven, as shown, an endless tray conveyor 26 traveling in the direction of the arrows in FIGURE 1b, conveys the trays 28 through the baking chamber in an upper and a lower lap along the superimposed longitudinally extending runs 30, 32, 34 and 36. An upstanding run 38 connects the forward ends of the runs 30 and 36 to complete the circuit of the trays through the oven chamber.

The tray conveyor 26, illustrated rather diagrammatically in FIGURES 1a and 1b, may be of any suitable form well known in the art, and includes endless chains 40 and 42, one at each side of the oven, with one chain offset forwardly of the other, chain 40 being offset forwardly of chain 42, as shown in FIGURE 1a. The chains 40 and 42 follow a circuitous path through the oven along the runs 30, 32, 34, 36 and 38, and at the turns from one run to the other, the chains 40 and 42 are trained over suitable sprockets and guide shoes in a manner well known in the art. A plurality of transversely extending equidistantly spaced trays, a representative number of which are indicated by reference numeral 28, are pivotally supported at their ends by and between the chains 40 and 42. Suitable means is provided for maintaining the trays 28 in a horizontal position as they are conveyed throughout the oven. Such means for stabilizing the trays is well known in the art, and since it does not constitute a part of the present invention, it has not been shown in the drawings. The upstanding run 38 of the tray conveyor 26 is arranged to travel in close proximity to the oven opening 44, through which the trays may be loaded and unloaded manually or by suitable mechanical means.

The products to be baked, upon being loaded onto successive trays 28 through opening 44, are passed successively through baking chamber zone A encompassing the forward portion of tray conveyor run 30, zone B encompassing the rearward portion of tray conveyor run 30, zone C encompassing the rearward portion of tray conveyor run 32, zone D encompassing the forward portion of tray conveyor run 32, zone E encompassing the forward portion of tray conveyor run 34, zone F encompassing the rearward portion of tray conveyor run 34, zone G encompassing the rearward portion of tray conveyor run 36, and zone H encompassing the forward portion of tray conveyor run 36.

The heating system of the oven includes a plurality of transversely extending longitudinally spaced tubular fluid fuel burners 46 beneath each of the tray conveyor runs 30, 32, 34 and 36. The burners 46 may be of any suitable type, conventional in the art, so that the specific construction thereof is not shown or described.

A horizontal imperforate partition 48 is disposed approximately midway between the tray conveyor runs 30 and 32. The partition 48 extends laterally from inner sheet 50 of oven side wall 18 to inner sheet 52 of oven side wall 20, and longitudinally as nearly as practicable the length of the tray conveyor run 30, whereby to separate zones A and B from zones C and D. A horizontal perforate partition 54, coextensive with and spaced above partition 48, together with transverse front, intermediate and rear walls 56, 58 and 60 form with partition 48 longitudinally contiguous shallow plenum chambers 62 and 64 at the bottom of zones A and B, respectively. The perforate partition 54 is preferably formed of a plurality of transversely extending plates 66 longitudinally spaced part to form therebetween vents or slots 68, distributed substantially uniformly over the extent of the partition 54 providing communication between plenum chamber 62 and zone A, and between plenum chamber 64 and zone B.

A horizontal perforate partition 70, disposed below the inner or crown sheet 72 of the oven top wall 12, extends laterally the width of the interior of the oven and longitudinally as nearly as practicable the length of the oven. In order to accommodate exhaust fans or other appurtenances, the perforate partition terminates short of the ends of the oven, however, this does not materially affect the efficient functioning of my improved oven. Horizontal perforate partition 70, together with front, intermediate and rear walls 74, 76 and 78 form with crown sheet 72 longitudinally contiguous shallow plenum chambers 80 and 82 at the top of zones A and B, respectively. Partition 70 is preferably formed of a plurality of transversely extending plates 84 longitudinally spaced apart to form therebetween vents or slots 86, distributed substantially uniformly over the extent of the partition 70 providing communication between plenum chamber 80 and zone A, and between plenum chamber 82 and zone B.

A horizontal perforate partition 88, coextensive with and spaced below partition 48, together with transverse front, intermediate and rear walls 90, 92 and 94 form with partition 48, longitudinally contiguous shallow plenum chambers 96 and 98 at the top of zones D and C, respectively. Horizontal partition 88 is provided with a plurality of apertures 100 distributed substantially uniformly over the extent thereof, providing communication between plenum chamber 98 and zone C, and between plenum chamber 96 and zone D. If desired, the partition 88 can be formed in the same manner as partition 54 to provide vents or slots in place of the apertures 100.

A horizontal imperforate partition 102 is disposed approximately midway between the tray conveyor runs 32 and 34. The partition 102 extends laterally from inner sheet 50 of oven side wall 18 to inner sheet 52 of oven side wall 20, and longitudinally as nearly as practicable the length of the tray conveyor runs 32 and 34, whereby to separate zones C and D from zones E and F. A horizontal perforate partition 104, coextensive with and spaced above partition 102, together with transverse front, intermediate and rear walls 106, 108 and 110 form with partition 102 longitudinally contiguous shallow plenum chambers 112 and 114 at the bottom of zones C and D. The perforate partition 104 is preferably formed of a plurality of transversely extending plates 116 longitudinally spaced apart to form therebetween vents or slots 118, distributed substantially uniformly over the extent of the partition 104 providing communication between plenum chamber 112 and zone D, and between plenum chamber 114 and zone C.

A horizontal perforate partition 120, coextensive with and spaced below partition 102, together with transverse front, intermediate and rear walls 122, 124 and 126 form with partition 102, longitudinally contiguous shallow plenum chambers 128 and 130 at the top of zones E and F. Horizontal partition 120 is provided with a plurality of apertures 132 distributed substantially uniformly over the extent thereof, providing communication between plenum chamber 128 and zone E, and between plenum chamber 130 and zone F. If desired, the partition 120 can be formed in the same manner as partitions 54 and 104 to provide vents or slots in place of the apertures 132.

Approximately midway between tray conveyor run 34 and tray conveyor run 36 are longitudinally spaced forward and rearward shallow blow down ducts 134 and 136, extending transversely through the oven from inner sheet 50 of oven side wall 18 to inner sheet 52 of oven side wall 20. The longitudinal extents of the blow down ducts 134 and 136 are relatively small as compared to the longitudinal extent of the plenum chambers previously described. Blow down duct 134 includes an imperforate top wall 138, imperforate front and rear end walls 140 and 142, and a bottom wall 144 arranged to form longitudinally spaced transversely extending vents or slots 146 providing communication between blow down duct 134 and zone H. In similar manner blow down duct 136 includes imperforate top, front end and rear end walls 148, 150 and 152, and a bottom wall 154 arranged to form vents or slots 156 providing communication between blow down duct 136 and zone G.

Extending between, forward and rearward of the blow down ducts 134 and 136 and from inner sheet 50 of oven side wall 18 to inner sheet 52 of oven side wall 20 and as nearly as practicable the length of the tray conveyor runs 34 and 36, is a horizontal perforate partition 158, the purpose of which will be hereinafter explained. The perforate partition 158 is preferably formed of a plurality of transversely extending plates 160 longitudinally spaced apart to form therebetween vents or slots 162, distributed substantially uniformly over the extent of the partition 158 providing communication between zones E and H and between zones F and G.

A horizontal perforate partition 164, disposed above the inner sheet of the oven base 18, extends laterally the width of the interior of the oven and longitudinally as nearly as practicable the length of the oven. As shown in the drawings, the partition 164 terminates short of the front of the oven and extends all the way to the rear of the oven. However, if necessary to accommodate certain appurtenances, the partition 164 can terminate short of the rear of the oven without materially affecting the efficient functioning of my improved oven. Horizontal perforate partition 164, together with transverse front and intermediate walls 166 and 168 and the inner sheet of oven rear wall 16 form with the inner sheet of the oven base 18, longitudinally contiguous shallow plenum chambers 170 and 172 at the bottom of zones H and G, respectively. The perforate partition 164 is preferably formed of a plurality of transversely extending plates 174 longitudinally spaced apart to form therebetween vents or slots 176, distributed substantially uniformly over the extent of the partition 164, providing communication between plenum chamber 170 and zone H, and between plenum chamber 172 and zone G.

The previously referred to transversely extending burner tubes 46 are disposed between the front and rear ends of the transversely extending plates 66, 116, 160 and 174 of respective perforate partitions 54, 104, 158 and 164, whereby to protect the flames of the burner tubes 46 from the currents of air of the baking chamber atmosphere recirculating system, which will now be described.

Figure 2:
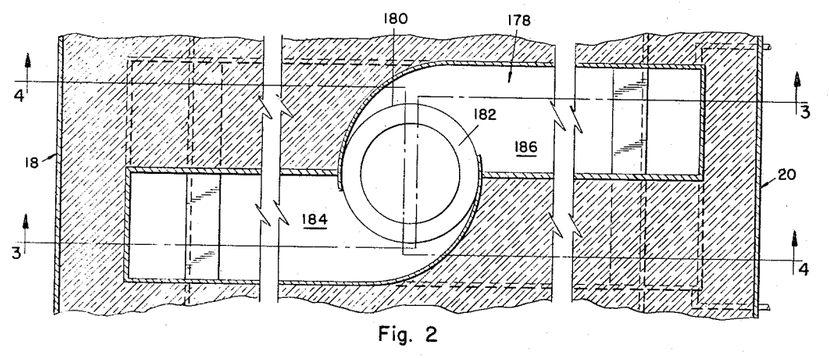

Referring to the oven atmosphere recirculating system for zone A, a transversely extending housing 178 is disposed within the top wall 12 of the oven, the laterally outer ends of which project into respective side walls 18 and 20 of the oven, as best shown in FIGURE 2. The intermediate portion of the housing 178 is configured to form a fan chamber 180 accommodating the fan 182. The portions of the housing 178 at opposite sides of the fan chamber 180 form discharge ducts 184 and 186 communicating with the discharge of the fan 182. As best shown in FIGURE 2, the discharge ducts 184 and 186 are longitudinally offset, one with respect to the other. The inner or crown sheet 72 of the oven top wall 12 may conveniently form the bottom wall 188 of the housing 178.

Figure 3:
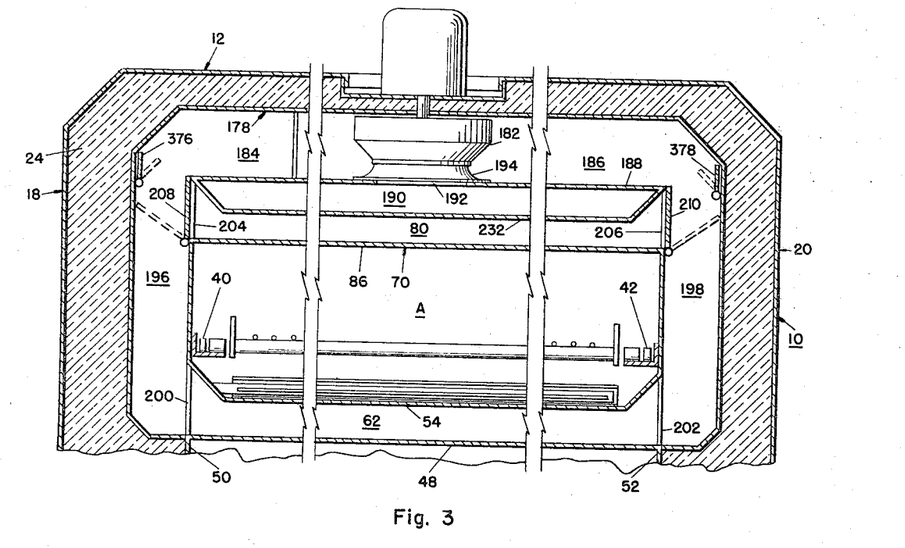
FIGURE 3 is a sectional view taken on irregular line 3—3 of FIGURE 2.
Figure 4:
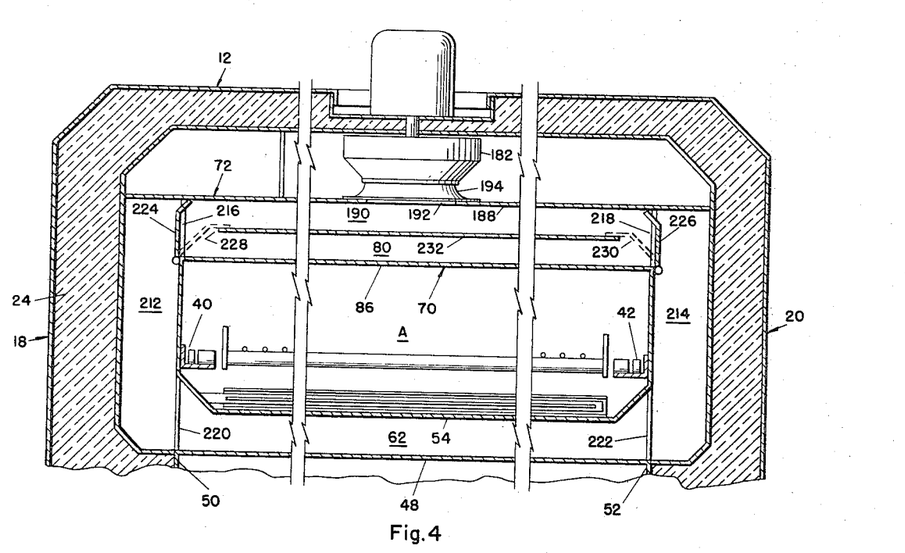
FIGURE 4 is a sectional view taken on irregular line 4—4 of FIGURE 2.

Below the housing 178 is a transversely extending shallow collecting duct 190 extending from inner sheet 50 of oven side wall 18 to inner sheet 52 of oven side wall 20, as best shown in FIGURES 3 and 4. The collecting duct 190 extends through the plenum chamber 80 and has its bottom wall in spaced relation above the partition 70 that forms the bottom of the plenum chamber 80. The bottom wall 188 of the housing 178, which together with crown sheet 72 forms the top wall of the collecting duct 190, is provided with a circular opening 192 embraced by the inlet ring 194 of the fan 182, providing communication between the collecting duct 190 and the intake side of the fan 182.

Referring more particularly to FIGURE 3, similar vertical blowing ducts 196 and 198 are respectively disposed in oven side walls 18 and 20 between the inner and outer sheets thereof. The vertical blowing ducts 196 and 198 communicate at their upper ends with the laterally outer ends of discharge ducts 184 and 186 and at their lower ends they communicate through openings 200 and 202 in inner sheets 50 and 52 of side walls 18 and 20 with opposite sides of the plenum chamber 62. Subjacent their upper ends, the blowing ducts 196 and 198 are arranged to communicate through openings 204 and 206 in inner sheets 50 and 52 of side walls 18 and 20 with opposite sides of plenum chamber 80. Flapper valves or dampers 208 and 210 are mounted in blowing ducts 196 and 198 adjacent the lower edges of openings 204 and 206 for pivotal swinging movement about a horizontal axis between their full line and phantom line positions. In the full line position of dampers 208 and 210, the openings 204 and 206 are closed so that recirculated oven atmosphere is discharged through openings 200 and 202 into bottom plenum chamber 62 of zone A; while in the phantom line position of dampers 208 and 210 the blowing ducts 196 and 198 are closed off below the openings 204 and 206 so that recirculated oven atmosphere is discharged through openings 204 and 206 into the top plenum chamber 80 of zone A. Any suitable means such as an operating rod not shown, accessible from outside the oven, is provided for selectively moving dampers 208 and 210 to one or the other of their above described positions.

Referring more particularly to FIGURE 4, similar vertical return ducts 212 and 214 are respectively disposed in oven side walls 18 and 20 between the inner and outer sheets thereof in side by side relation with respect to the blowing ducts 196 and 198. The upper ends of return ducts 212 and 214 are closed off by the crown sheet 72 but subjacent thereto communicate through openings 216 and 218 with collecting duct 190. The lower ends of return ducts 212 and 214 communicate with lower plenum chamber 62 through openings 220 and 222 in inner sheets 50 and 52 of oven side walls 18 and 20. Flapper valves or dampers 224 and 226 are mounted in return ducts 212 and 214 adjacent the lower edges of openings 216 and 218 for pivotal swinging movement between their full line and phantom line positions. In the full line position of dampers 224 and 226 communication is provided between upper plenum chamber 80 and collecting duct 190 through openings 228 and 230 in opposite sides of the bottom wall 232 of the collecting duct 190. In the phantom line position of dampers 224 and 226 communication is provided between lower plenum chamber 62 and collecting duct 190.

From the preceding description of the duct and damper arrangement associated with zone A, it is seen that with the dampers 208, 210, 224 and 226 in their full line positions, circulation of oven atmosphere will be from fan 182 through discharge ducts 184 and 186, then through blowing ducts 196 and 198 into opposite sides of the bottom plenum chamber 62 of zone A. From plenum chamber 62 the atmosphere is discharged through the vents or slots 68 to provide a substantially uniform upward flow of atmosphere throughout zone A. The atmosphere is withdrawn from zone A into the top plenum chamber 80 through the slots or vents 86, from whence it flows through openings 228 and 230 into collecting duct 190 and then through opening 192 to the intake side of the fan 182.

Now, if it is desired to provide more top heat or direct steam from the conventional steam supply pipes 234 in zone A against the top of the product, the dampers 208, 210, 224 and 226 are moved to their phantom line positions. Circulation of atmosphere will now be from the discharge of fan 182 through discharge ducts 184 and 186 into blowing ducts 196 and 198, and then through openings 204 and 206 into top plenum chamber 80. From plenum chamber 80 the atmosphere is discharged through slots or vents 86 to provide a substantially uniform downward flow of atmosphere throughout zone A. The atmosphere is withdrawn from zone A into lower plenum chamber 62 through the slots or vents 68, from whence it flows through openings 220 and 222, return ducts 212 and 214, and openings 216 and 218 into collecting duct 190, and then through opening 192 to the intake side of the fan 182.

Through the means described above the directional flow of recirculated atmosphere in zone A in an upward or downward direction can be selectively controlled independently of the directional flow of recirculated atmosphere in the other zones of the oven and undesirable commingling of the oven atmosphere recirculated in zone A with recirculated air in the other zones of the oven is minimized.

Figure 5:
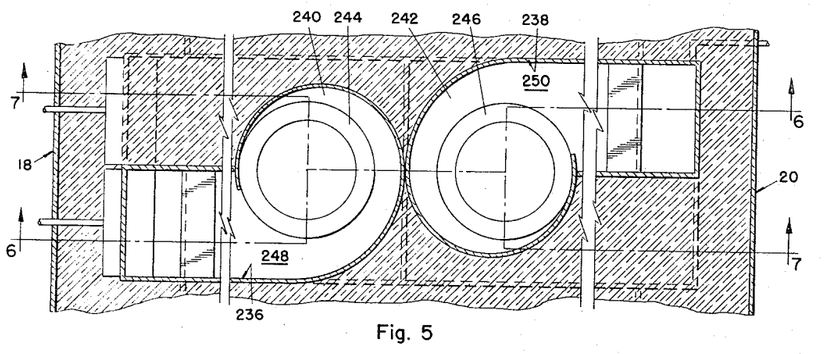
Figure 6:
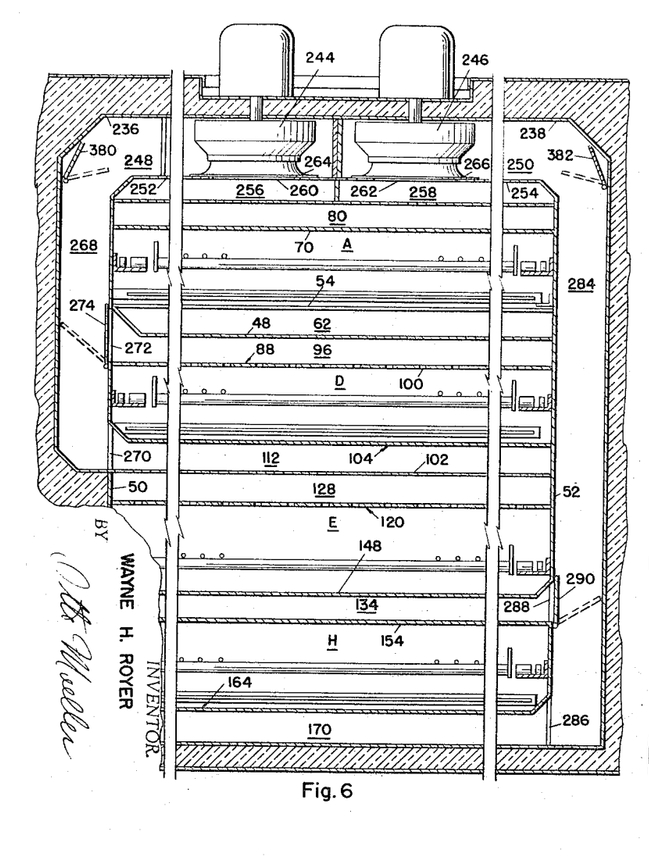
FIGURE 6 is a sectional view taken on irregular line 6—6 of FIGURE 5.

Referring to the oven atmosphere recirculating system for zones D, E and H, a pair of laterally adjacent transversely extending housings 236 and 238 are disposed within the top wall 12 of the oven, the laterally outer ends of which project into respective side walls 18 and 20 of the oven, as best shown in FIGURES 5 and 6. The adjacent inner portions of the housings 236 and 238 have a spiral shaped configuration in horizontal cross section, forming fan chambers 240 and 242 for the fans 244 and 246. The laterally outer portions of the housings 236 and 238 form discharge ducts 248 and 250 which communicate respectively with the discharge sides of fans 244 and 246. As best shown in FIGURE 5, the discharge ducts 248 and 250 are longitudinally offset, one with respect to the other. The inner or crown sheet 72 of the oven top wall 12 may conveniently form the bottom walls 252 and 254 of the housings 236 and 238.

Below the housings 236 and 238 are a pair of laterally adjacent transversely extending shallow collecting ducts 256 and 258 which extend, respectively, to the inner sheets 50 and 52 of oven side walls 18 and 20, as best shown in FIGURE 6. The collecting ducts 256 and 258 extend through the plenum chamber 80 and have their bottom walls in spaced relation above the partition 70 that forms the bottom of the plenum chamber 80. The bottom walls 252 and 254 of the housings 236 and 238, which together with crown sheet 72 form the top walls of collecting ducts 256 and 258, are provided with circular openings 260 and 262 embraced by inlet rings 264 and 266 of the fans 244 and 246, providing communication between the collecting ducts 256 and 258 and the intake sides of fans 244 and 246.

Referring more particularly to FIGURE 6, a vertical blowing duct 268 is disposed in oven side wall 18 between the inner and outer sheets thereof. The vertical blowing duct 268 communicates at its upper end with the laterally outer end of discharge duct 248, and at its lower end communicates through opening 270 in inner sheet 50 with lower plenum chamber 112 of zone D. Between its upper and lower ends, vertical blowing duct 268 communicates through opening 272 in inner sheet 50 with upper plenum chamber 96 of zone D. A flapper valve or damper 274 is mounted in blowing duct 268 adjacent the lower edge of opening 272 for pivotal swinging movement about a horizontal axis between its full line and phantom line positions. In the full line position of damper 274, the opening 272 is closed so that recirculated oven atmosphere is discharged through opening 270 into plenum chamber 112; while in the phantom line position of damper 274 the blowing duct 268 is closed off below the opening 272 so that recirculated oven atmosphere is discharged through opening 272 into plenum chamber 96. Any suitable means such as an operating rod, not shown, accessible from outside the oven, is provided for selectively moving damper 274 to one or the other of its above described positions.

Figure 7:
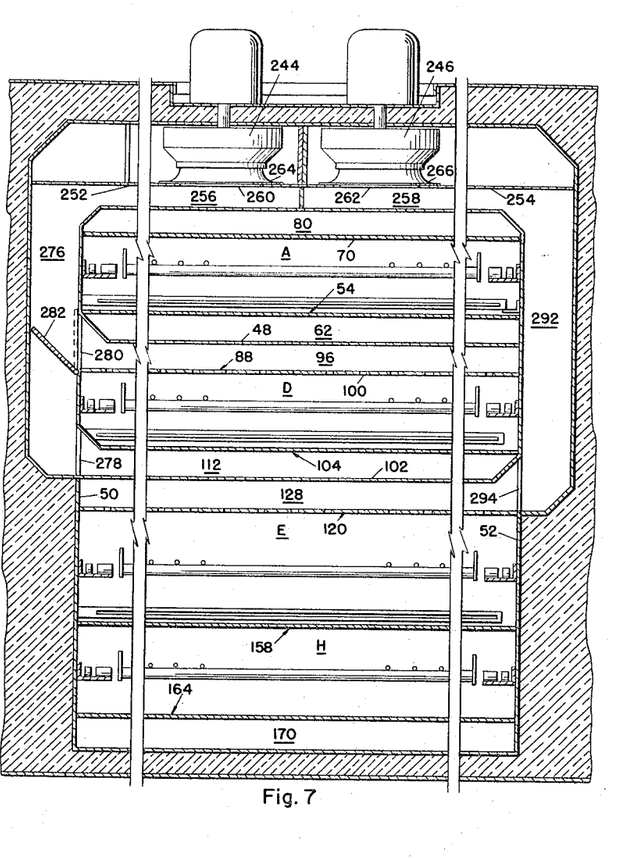
FIGURE 7 is a sectional view taken on irregular line 7—7 of FIGURE 5.
Figure 8:
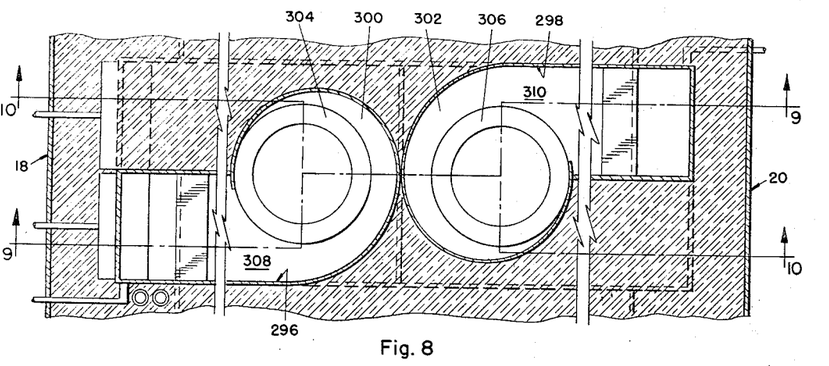
FIGURE 8 is a sectional view taken on line 8—8 of FIGURE 1b.

Referring more particularly to FIGURE 7, a vertical return duct 276 is disposed in oven side wall 18 between the inner and outer sheets thereof in side by side relation with respect to blowing duct 268. The upper end of return duct 276 communicates with collecting duct 256 and the lower end thereof communicates through opening 278 in inner sheet 50 of oven side wall 18 with lower plenum chamber 112 of zone D. Between its upper and lower ends, vertical return duct 276 communicates through opening 280 in inner sheet 50 of oven side wall 18 with upper plenum chamber 96 of zone D. A flapper valve or damper 282 is mounted in return duct 276 adjacent the lower edge of opening 280 for pivotal swinging movement about a horizontal axis between its full line and phantom line positions, whereby in the phantom line position of damper 282 communication is provided between lower plenum chamber 112 and collecting duct 256, and in the full line position of damper 282 communication is provided between upper plenum chamber 96 and collecting duct 256. Any suitable means such as an operating rod, not shown, accessible from outside the oven, is provided for selectively moving damper 282 to one or the other of its above described positions.

From the preceding description of the duct and damper arrangement associated with zone D, it is seen that with the dampers 274 and 282 in their full line positions, circulation of oven atmosphere will be from fan 244 through discharge duct 248, then through blowing duct 268 into the bottom plenum chamber 112 of zone D. From plenum chamber 112 the atmosphere is discharged through the vents or slots 118 to provide a substantially uniform upward flow of atmosphere throughout zone D. The atmosphere is withdrawn from zone D into the top plenum chamber 96 of zone D through the apertures 100, from whence it flows through opening 280 into return duct 276, then into collecting duct 256, and finally through opening 260 to the intake side of fan 244.

Now, if it is desired to provide more top heat in zone D, the dampers 274 and 282 are moved to their phantom line positions. Circulation of atmosphere will now be from fan 244 through discharge duct 248 into blowing duct 268, then through opening 272 into top plenum chamber 96 of zone D. From plenum chamber 96 the atmosphere is discharged through apertures 100 to provide a substantially uniform downward flow of atmosphere throughout zone D. The atmosphere is withdrawn from zone D into lower plenum chamber 112 through the apertures 118, from whence it flows through opening 278 into return duct 276, then into collecting duct 256 and through opening 260 to the intake side of the fan 244.

Referring again more particularly to FIGURE 6, a vertical blowing duct 284 is disposed in oven side wall 20 between the inner and outer sheets thereof. The vertical blowing duct 284 communicates at its upper end with the laterally outer end of discharge duct 250, and at its lower end communicates through opening 286 in inner sheet 52 with the plenum chamber 170 at the bottom of zone H. Between its upper and lower ends, vertical blowing duct 284 communicates through opening 288 in inner sheet 52 with the blowdown duct 134. A flapper valve or damper 290 is mounted in blowing duct 284 adjacent the lower edge of opening 288 for pivotal swinging movement about a horizontal axis between its full line and phantom line positions or any intermediate position. In the full line position of damper 290, the opening 288 is closed so that recirculated oven atmosphere is discharged through opening 286 into plenum chamber 170; in the phantom line position of damper 290 the blowing duct 284 is closed off below the opening 288 so that recirculated oven atmosphere is discharged through opening 288 into blowdown duct 134; while in intermediate positions of damper 290 the recirculated oven atmosphere is discharged through openings 286 and 288 into plenum chamber 170 and blowdown duct 134 in desired proportions. Any suitable means such as an operating rod, accessible from outside the oven, is provided for selectively moving damper 290 to any one of its above described positions.

Referring more particularly to FIGURE 7, a vertical return duct 292 is disposed in oven side wall 20 between the inner and outer sheets thereof. The upper end of return duct 292 communicates with collecting duct 258 and the lower end thereof communicates through opening 294 in inner sheet 52 of oven side wall 20 with the plenum chamber 128 at the top of zone E.

From the preceding description of the duct and damper arrangement associated with zones E and H, it is seen that with damper 290 in its full line position, circulation of oven atmosphere will be from fan 246 through discharge duct 250, then through blowing duct 284 into the bottom plenum chamber 170 of zone H. From plenum chamber 170 the atmosphere is discharged through the vents or slots 176 to provide an upward flow of atmosphere throughout zone H. From zone H the atmosphere flows through the vents or slots 162 in partition 158 and then in a generally upward direction through zone E and into plenum chamber 128 through apertures 132 in partition 120. From plenum chamber 128 the atmosphere flows through opening 294 into return duct 292, then into collecting duct 258, and finally through opening 262 to the intake side of fan 246. If at that time the atmosphere recirculating system for previously described zone D is arranged for upward flow of atmosphere therethrough, an insignificant amount of the atmosphere discharged from the extreme forward end of the plenum chamber 170 may commingle with the atmosphere of zone D and flow into plenum chamber 96.

If it is desired to direct more top heat on the product as it passes through zone H, to produce a browner coloring on the top of the product, the damper 290 may be moved to its phantom line position or to any position intermediate its full and phantom line positions, depending on the amount of top heat it is desired to direct on the top of the product. With the damper 290 in its phantom line position, circulation of the oven atmosphere will be from fan 246 through discharge duct 250, then through blowing duct 284 into blowdown duct 134 through opening 288. From blowdown duct 134 the atmosphere is discharged through slots or vents 146 downwardly against the product in zone H, then returns upwardly through slots or vents 162 in partition 158 into zone E and through apertures 132 into plenum chamber 128. From plenum chamber 128 the atmosphere flows through opening 294 into return duct 292, then into collecting duct 258, and finally through opening 262 to the intake side of fan 246.

In intermediate positions of damper 290, the atmosphere from blowing duct 284 will be proportionately discharged into plenum chamber 170 and blowdown duct 134, and circulation of atmosphere will be as described above.

Figure 9:
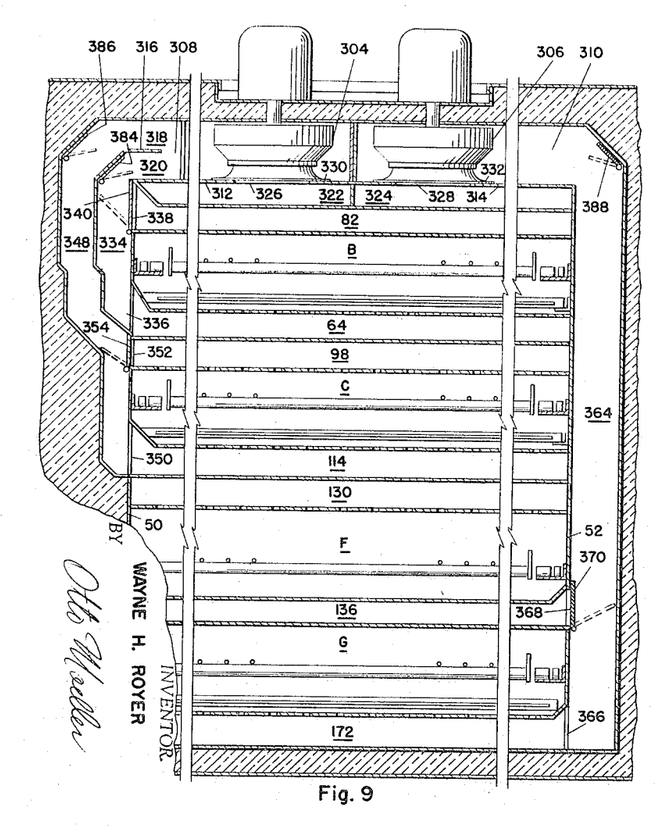
FIGURE 9 is a sectional view taken on irregular line 9—9 of FIGURE 8.

Referring now to the oven atmosphere recirculating system for zones B, C, F and G and particularly to FIGURES 1b, 8, 9 and 10, a pair of laterally adjacent transversely extending housings 296 and 298 are disposed within the top wall 12 of the oven, the laterally outer ends of which project into respective side walls 18 and 20 of the oven. The adjacent inner portions of the housings 296 and 298 have a spiral shaped configuration in horizontal cross section, forming fan chambers 300 and 302 for the fans 304 and 306. The laterally outer portions of the housings 296 and 298 form discharge ducts 308 and 310 which communicate respectively with the discharge sides of fans 304 and 306. The inner or crown sheet 72 of the oven top wall 12 may conveniently form the bottom walls 312 and 314 of the housings 296 and 298. The laterally outer end portion of the discharge duct 308, as best shown in FIGURE 9, is divided by a partition 316 into upper and lower discharge duct portions 318 and 320.

Below the housings 296 and 298 are a pair of laterally adjacent transversely extending shallow collecting ducts 322 and 324 which extend, respectively, to the inner sheets 50 and 52 of oven side walls 18 and 20. The collecting ducts 322 and 324 extend through the plenum chamber 82 and have their bottom walls in spaced relation above the partition 70 that forms the bottom wall of the plenum chamber 82. The bottom walls 312 and 314 of the housings 296 and 298, which together with crown sheet 72 form the top walls of collecting ducts 322 and 324, are provided with circular openings 326 and 328 embraced by inlet rings 330 and 332 of the fans 304 and 306, providing communication between the collecting ducts 322 and 324 and the intake sides of fans 304 and 306.

Referring more particularly to FIGURE 9, a vertical blowing duct 334 is disposed in oven side wall 18 between the inner and outer sheets thereof adjacent inner sheet 50. The vertical blowing duct 334 communicates at its upper end with the laterally outer end of the lower discharge duct portion 320 of discharge duct 308, and at its lower end communicates through opening 336 in inner sheet 50 with lower plenum chamber 64 of zone B. Subjacent its upper end, vertical blowing duct 334 communicates through opening 338 in inner sheet 50 with upper plenum chamber 82 of zone B. A flapper valve or damper 340 is mounted in blowing duct 334 adjacent the lower edge of opening 338 for pivotal swinging movement about a horizontal axis between its full line and phantom line positions. In the full line position of damper 340, the opening 338 is closed so that recirculated oven atmosphere is discharged through opening 336 into plenum chamber 64; while in the phantom line position of damper 340 the blowing duct 334 is closed off below the opening 338 so that recirculated oven atmosphere is discharged through opening 338 into plenum chamber 82. Any suitable means such as an operating rod, not shown, accessible from outside the oven, is provided for selectively moving damper 340 to one or the other of its above described positions.

Figure 10:
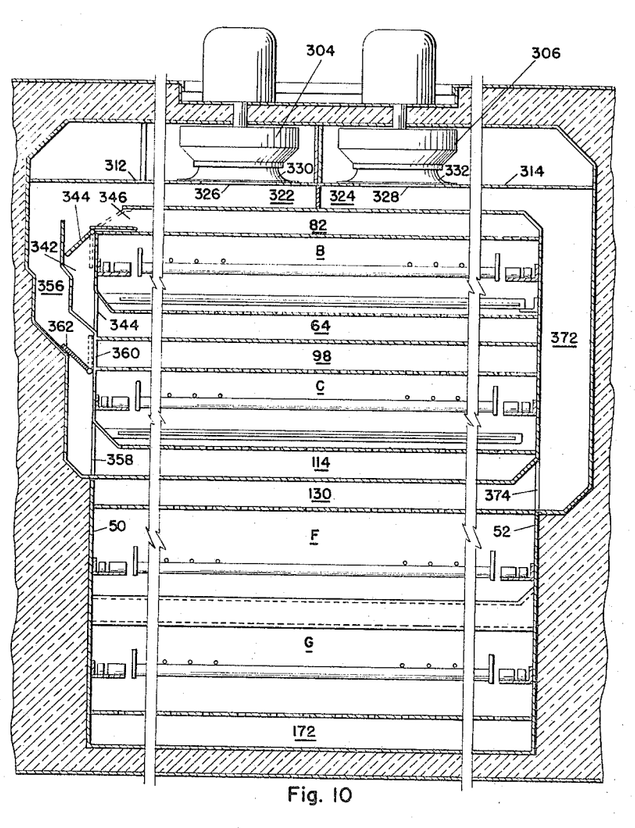
FIGURE 10 is a sectional view taken on irregular line 10—10 of FIGURE 1b.

Referring more particularly to FIGURE 10, a vertical return duct 342 is disposed in oven side wall 18 between the inner and outer sheets thereof in side by side relation with respect to blowing duct 334. The upper end of return duct 342 communicates with collecting duct 322 and the lower end thereof communicates through opening 344 in inner sheet 50 of oven side wall 18 with lower plenum chamber 64 of zone B. A flapper valve or damper 344 is mounted at the upper laterally inner edge of return duct 342 for pivotal swinging movement about a horizontal axis between its full line and phantom line positions. In the full line position of damper 344, return duct 342 is closed off and communication is provided between plenum chamber 82 and collecting duct 322 through opening 346 at the laterally outer left hand end of the plenum chamber 82. In the phantom line position of damper 344, opening 346 is closed off providing communication between plenum chamber 64 and collecting duct 322.

From the preceding description of the duct and damper arrangement associated with zone B, it is seen that with the dampers 340 and 344 in their full line positions, circulation of oven atmosphere will be from fan 304 through discharge duct 308 and discharge duct portion 320, then through blowing duct 334 into bottom plenum chamber 64 of zone B. From plenum chamber 64 the atmosphere is discharged through the vents or slots 68 to provide a substantially uniform upward flow of atmosphere throughout zone B. The atmosphere is withdrawn from zone B into the top plenum chamber 82 through the slots or vents 86, from whence it flows through opening 346 into collecting duct 322 and then through opening 326 to the intake side of the fan 304.

Now, if it is desired to provide more top heat on the product as it progresses through zone B, the dampers 340 and 344 are moved to their phantom line positions. Circulation of atmosphere will now be from fan 304 through discharge duct 308 and discharge duct portion 320 into blowing duct 334, then through opening 338 into top plenum chamber 82. From plenum chamber 82 the atmosphere is discharged through the slots or vents 86 to provide a substantially uniform downward flow of atmosphere through zone B. The atmosphere is withdrawn from zone B into lower plenum chamber 64 through the slots or vents 68, from whence it flows through opening 344, return duct 342 into collecting duct 322, and then through opening 326 to the intake side of the fan 304.

Referring again to FIGURE 9, there is disposed in side wall 18 laterally outward of and extending above and below the upper and lower ends of blowing duct 334, a second blowing duct 348. The blowing duct 348 communicates at its upper end with the laterally outer end of the upper discharge duct portion 318 of discharge duct 308, and at its lower end communicates through opening 350 in inner sheet 50 with the lower plenum chamber 114 of zone C. Between its upper and lower ends, blowing duct 348 communicates through opening 352 in inner sheet 50 with upper plenum chamber 98 of zone C. A flapper valve or damper 354 is mounted in blowing duct 348 adjacent the lower edge of opening 352 for pivotal swinging movement about a horizontal axis between its full line and phantom line positions. In the full line position of damper 354, the opening 352 is closed so that recirculated oven atmosphere is discharged through opening 350 into plenum chamber 114; while in the phantom line position of damper 354 the blowing duct 348 is closed off below the opening 352 so that recirculated oven atmosphere is discharged through opening 352 into plenum chamber 98. Any suitable means such as an operating rod, not shown, accessible from outside the oven, is provided for selectively moving damper 354 to one or the other of its above described positions.

Referring more particularly to FIGURE 10, there is disposed in side wall 18 laterally outward of and extending above and below the upper and lower ends of return duct 342 and in side by side relation with respect to the blowing duct 348, a second return duct 356. The upper end of return duct 356 communicates with collecting duct 322 and the lower end thereof communicates through opening 358 in inner sheet 50 of oven side wall 18 with lower plenum chamber 114 of zone C. Between its upper and lower ends, return duct 356 communicates through opening 360 in inner sheet 50 with upper plenum chamber 98 of zone C. A flapper valve or damper 362 is mounted in return duct 356 adjacent the lower edge of opening 360 for pivotal swinging movement about a horizontal axis between its full line and phantom line positions. In the full line position of damper 362, return duct 356 is closed off below the opening 360 and communication is provided between plenum chamber 98 and collecting duct 322; while in the phantom line position of damper 362, opening 360 is closed off providing communication between plenum chamber 114 and collecting duct 322.

From the preceding description of the duct and damper arrangement associated with zone C, it is seen that with the dampers 354 and 362 in their full line positions, circulation of oven atmosphere will be from fan 304 through discharge duct 308 and discharge duct portion 318, then through blowing duct 348 into bottom plenum chamber 114 of zone C. From plenum chamber 114 the atmosphere is discharged through the vents or slots 118 to provide a substantially uniform upward flow of atmosphere throughout zone C. The atmosphere is withdrawn from zone C into the top plenum chamber 98 of zone C through the apertures 100, from whence it flows through opening 360 into return duct 356, then into collecting duct 322 and finally through opening 326 to the intake side of the fan 304.

Now, if it is desired to provide more top heat on the product as it progresses through zone C, the dampers 354 and 362 are moved to their phantom line positions. Circulation of atmosphere will now be from fan 304 through discharge duct 308 and discharge duct portion 318 into blowing duct 348, then through opening 352 into top plenum chamber 98 of zone C. From plenum chamber 98 the atmosphere is discharged through the apertures 100 to provide a substantially uniform downward flow of atmosphere through zone C. The atmosphere is withdrawn from zone C into lower plenum chamber 114 through the slots or vents 118, from whence it flows through opening 358, return duct 356 and collecting duct 322, and finally through opening 326 to the intake side of the fan 304.

Referring again more particularly to FIGURE 9, a vertical blowing duct 364 is disposed in oven side wall 20 between the inner and outer sheets thereof. The vertical blowing duct 364 communicates at its upper end with the laterally outer end of discharge duct 310, and at its lower end communicates through opening 366 in inner sheet 52 with the plenum chamber 172 at the bottom of zone G. Between its upper and lower ends, vertical blowing duct 364 communicates through opening 368 in inner sheet 52 with the blowdown duct 136. A flapper valve or damper 370 is mounted in blowing duct 364 adjacent the lower edge of opening 368 for pivotal swinging movement about a horizontal axis between its full line and phantom line positions or any intermediate position. In the full line position of damper 370, the opening 368 is closed so that recirculated oven atmosphere is discharged through opening 366 into plenum chamber 172; in the phantom line position of damper 370 the blowing duct 364 is closed off below the opening 368 so that recirculated oven atmosphere is discharged through opening 368 into blowdown duct 136; while in intermediate positions of damper 370 the recirculated oven atmosphere is discharged through openings 366 and 368 into plenum chamber 172 and blowdown duct 136 in desired proportions. Any suitable means such as an operating rod, accessible from outside the oven, is provided for selectively moving damper 370 into any one of its above described positions.

Referring more particularly to FIGURE 10, a vertical return duct 372 is disposed in oven side wall 20 between the inner and outer sheets thereof. The upper end of return duct 372 communicates with collecting duct 324 and the lower end thereof communicates through opening 374 in inner sheet 52 of oven side wall 20 with the plenum chamber 130 at the top of zone F.

From the preceding description of the duct and damper arrangement associated with zones F and G, it is seen that with damper 370 in its full line position, circulation of oven atmosphere will be from fan 306 through discharge duct 310, then through blowing duct 364 into the bottom plenum chamber 172 of zone G. From plenum chamber 172 the atmosphere is discharged through the vents or slots 176 to provide an upward flow of atmosphere throughout zone G. From zone G the atmosphere flows through the vents or slots 162 in partition 158 and then in a generally upward direction through zone F and into plenum chamber 130 through apertures 132 in partition 120. From plenum chamber 130 the atmosphere flows through opening 374 into return duct 372, then into collecting duct 324, and finally through opening 328 to the intake side of fan 306.

If it is desired to direct more top heat on the product as it passes through zone G, to produce a browner coloring on the top of the product, the damper 370 may be moved to its phantom line position or to any position intermediate its full and phantom line position, depending on the amount of top heat it is desired to direct on the top of the product. With the damper 370 in its phantom line position, circulation of the oven atmosphere will be from fan 306 through discharge duct 310, then through blowing duct 364 into blowdown duct 136 through opening 368. From blowdown duct 136 the atmosphere is discharged through slots or vents 156 downwardly against the product in zone G, then returns upwardly through slots or vents 162 in partition 158 into zone F and through apertures 132 into plenum chamber 130. From plenum chamber 130 the atmosphere flows through opening 374 into return duct 372, then into collecting duct 324, and finally through opening 328 to the intake side of fan 306.

The intermediate positions of damper 370, the atmosphere from blowing duct 364 will be proportionately discharged into plenum chamber 172 and blowdown duct 136, and circulation of atmosphere will be as described above.

The blowing ducts 196, 198, 268, 284, 334, 348 and 364 are preferably provided with respective adjustable dampers 376, 378, 380, 382, 384, 386 and 388 for controlling the volume of recirculated oven atmosphere. Suitable means such as operating rods, not shown, accessible from outside the oven, are provided for adjusting the dampers.

While the invention has been shown as applied to a direct fired oven heating system employing a series of gas burners 46 in each of the baking zones A, B, C, D, E, F, G and H. It will be understood that it is equally applicable to an indirect fired oven heating system of well known conventional construction employing a bank of longitudinally extending laterally spaced flues disposed beneath each of the tray conveyor runs 30, 32, 34 and 36 and connected to a source of combustion gases. In this construction the perforated partition 158 shown in the drawings is dispensed with.

In relatively short ovens, the zones B, C, D and G together with their baking chamber atmosphere recirculating systems are preferably dispensed with, and the zones A, D, E and H together with their baking chamber atmosphere recirculating systems are retained and extended throughout the length of the oven.

I claim:

1. In an atmosphere recirculating system for a double lap oven having an endless tray conveyor including first, second, third and fourth superposed horizontal runs connected at their ends, means disposed in spaced relation above and below said first run forming longitudinally elongated plenum chambers, means disposed in spaced relation above and below said second run forming longitudinally elongated plenum chambers, means disposed in spaced relation above said third run and below said fourth run forming longitudinally elongated plenum chambers, the confronting faces of each pair of plenum chambers having a multiplicity of apertures directed toward their associated run of said tray conveyor, first fan means, valve controlled blowing duct means selectively providing communication between the discharge of said first fan means and one or the other of said upper and lower plenum chambers associated with said first tray conveyor run and valve controlled return duct means selectively providing communication between the intake of said first fan means and one or the other of said upper and lower plenum chambers associated with said first tray conveyor run for selectively recirculating oven atmosphere upwardly or downwardly against the product on said first tray conveyor run, second fan means, valve controlled blowing duct means selectively providing communication between the discharge of said second fan means and one or the other of said upper and lower plenum chambers associated with said second tray conveyor run and valve controlled return duct means selectively providing communication between the intake of said second fan means and one or the other of said upper and lower plenum chambers associated with said second tray conveyor run for selectively recirculating oven atmosphere upwardly or downwardly against the product on said second tray conveyor run, third fan means, blowing duct means providing communication between the discharge of said third fan means and the lower plenum chamber associated with said fourth tray conveyor run and return duct means providing communication between the intake of said third fan means and the upper plenum chamber associated with said third tray conveyor run for recirculating oven atmosphere upwardly against the product on said third and fourth tray conveyor runs.

2. A construction in accordance with claim 1 including a transversely elongated blowdown duct extending from one side to the other of the oven disposed between and in spaced relation with respect to said third and fourth tray conveyor runs and having apertures directed toward said fourth tray conveyor run, said blowdown duct communicating with the blowing duct means associated with said third fan means, and valve means in said last named blowing duct for controlling the relative amounts of recirculated oven atmosphere delivered to said blowing duct and the lower plenum chamber associated with said fourth tray conveyor run.

3. In a baking chamber atmosphere recirculating system for a double lap oven having an endless tray conveyor including vertically spaced first, second, third and fourth superposed horizontal runs connected at their ends,     means disposed in spaced relation above and below said first run and extending the major portion of the length thereof forming forward and rearward plenum chambers defining between them a forward and a rearward baking zone,     means disposed in spaced relation above and below said second run and extending the major portion of the length thereof forming forward and rearward plenum chambers defining between them a forward and a rearward baking zone,     means disposed in spaced relation above said third and below said fourth run and extending the major portion of the length thereof forming forward and rearward plenum chambers defining between them forward and rearward baking zones,     the confronting faces of the upper and lower plenum chambers of said zones having a multiplicity of apertures directed toward their associated run of said tray conveyor,     first fan means,     valve controlled blowing duct means selectively providing communication between the discharge of said first fan means and one or the other of said upper and lower forward plenum chambers associated with said first tray conveyor run and valve controlled return duct means selectively providing communication between the intake of said first fan means and one or the other of said upper and lower forward plenum chambers associated with said first tray conveyor run for selectively recirculating oven atmosphere upwardly or downwardly through the forward baking zone associated with said first tray conveyor run,     second fan means,     blowing duct means providing communication between the discharge of said second fan means and the lower forward plenum chambers associated with said second and fourth tray conveyor runs and return duct means providing communication between the intake of said second fan means and the upper forward plenum chambers associated with said second and third tray conveyor runs for recirculating oven atmosphere upwardly through the forward baking zones associated with said second, third and fourth tray conveyor runs,     third fan means,     blowing duct means providing communication between the discharge of said third fan means and the lower rearward plenum chambers associated with said first, second and fourth tray conveyor runs and return duct means providing communication between the intake of said third fan means and the upper rearward plenum chambers associated with said first, second and third tray conveyor runs for recirculating oven atmosphere upwardly through the rearward baking zones associated with said first, second, third and fourth tray conveyor runs.

4. A construction in accordance with claim 3 including a pair of transversely elongated blowdown ducts spaced apart lengthwise of the oven and extending from one side to the other thereof, each of said blowdown ducts being disposed between and in spaced relation with respect to said third and fourth tray conveyor run, one of said blowdown ducts communicating with the blowing duct means associated with said second fan means and the other of said blowdown ducts communicating with the blowing duct means associated with said third fan means, and valve means in each of said last named blowing ducts for controlling the relative amounts of recirculated oven atmosphere delivered to said blowdown ducts and the forward and rearward lower plenum chambers associated with said fourth tray conveyor run.

5. In a baking chamber atmosphere recirculating system for a double lap oven having an endless tray conveyor including vertically spaced first, second, third and fourth superposed horizontal runs connected at their ends,     means disposed in spaced relation above and below said first run and extending the major portion of the length thereof forming forward and rearward plenum chambers defining between them a forward and a rearward baking zone,     means disposed in spaced relation above said second and below said fourth tray conveyor run and extending the major portion of the length thereof forming forward and rearward plenum chambers embracing therebetween forward baking zones associated with said second, third and fourth tray conveyor runs and rearward baking zones associated with said second, third and fourth tray conveyor runs,     the confronting faces of the upper and lower plenum chambers of said zones having a multiplicity of apertures directed toward their associated run of said tray conveyor,     first fan means,     valve controlled blowing duct means selectively providing communication between the discharge of said first fan means and one or the other of said upper and lower forward plenum chambers associated with said first tray conveyor run and valve controlled return duct means selectively providing communication between the intake of said first fan means and one or the other of said upper and lower forward plenum chambers associated with said first tray conveyor run for selectively recirculating oven atmosphere upwardly or downwardly through the forward baking zone associated with said first tray conveyor run,     second fan means,     means for recirculating oven atmosphere through said forward baking zones associated with said second, third and fourth tray conveyor runs including blowing duct means communicating with the discharge of said second fan means and the forward plenum chamber associated with said fourth tray conveyor run and including return duct means communicating with the intake of said second fan means and the forward plenum chamber associated with said second tray conveyor run,     third fan means,     means for recirculating oven atmosphere through said rearward baking zones associated with said first, second, third and fourth tray conveyor runs including blowing duct means communicating with the discharge of said third fan means and the rearward lower plenum chambers associated with said first and fourth tray conveyor runs and including return duct means communicating with the intake of said third fan means and the rearward upper plenum chambers associated with said first and second tray conveyor runs.

6. A construction in accordance with claim 5 including a pair of transversely elongated blowdown ducts spaced apart lengthwise of the oven and extending from one side to the other thereof, each of said blowdown ducts being disposed between and in spaced relation with respect to said third and fourth tray conveyor runs and having apertures directed toward said fourth tray conveyor run, one of said blowdown ducts communicating with the blowing duct means associated with said second fan means and the other of said blowdown ducts communicating with the blowing duct means associated with said third fan means, and valve means in each of said last named blowing ducts for controlling the relative amounts of recirculated oven atmosphere delivered to said blowdown ducts and the forward and rearward lower plenum chambers associated with said fourth tray conveyor run.

7. In a baking chamber atmosphere recirculating system for a double lap oven having an endless tray conveyor including vertically spaced first, second, third and fourth superposed horizontal runs connected at their ends, means disposed in spaced relation above and below said first run and extending the major portion of the length thereof forming forward and rearward plenum chambers defining between them a forward and a rearward baking zone, means disposed in spaced relation above and below said second run and extending the major portion of the length thereof forming forward and rearward plenum chambers defining between them a forward and a rearward baking zone, means disposed in spaced relation above said third run and below said fourth run and extending the major portion of the length thereof forming forward and rearward plenum chambers defining between them forward and rearward baking zones, the confronting faces of the upper and lower plenum chambers of said zones having a multiplicity of apertures directed toward their associated run of said tray conveyor, first fan means, valve controlled blowing duct means selectively providing communication between the discharge of said first fan means and one or the other of said upper and lower forward plenum chambers associated with said first tray conveyor run and valve controlled return duct means selectively providing communication between the intake of said first fan means and one or the other of said upper and lower forward plenum chambers associated with said first tray conveyor run for selectively recirculating oven atmosphere upwardly or downwardly through the forward baking zone associated with said first tray conveyor run, second fan means, valve controlled blowing duct means selectively providing communication between the discharge of said second fan means and one or the other of said upper and lower forward plenum chambers associated with said second tray conveyor run and valve controlled return duct means selectively providing communication between the intake of said second fan means and one or the other of said upper and lower forward plenum chambers associated with said second tray conveyor run for selectively recirculating oven atmosphere upwardly or downwardly through the forward baking zone associated with said second tray conveyor run, third fan means, blowing duct means providing communication between the discharge of said third fan means and the lower forward plenum chamber associated with said fourth tray conveyor run and return duct means providing communication between the intake of said third fan means and the upper forward plenum chamber associated with said third tray conveyor run for recirculating oven atmosphere upwardly through the forward baking zones associated with said third and fourth tray conveyor runs, fourth fan means, a pair of valve controlled blowing duct means each selectively providing communication between the discharge of said fourth fan means and one or the other of the upper and lower rearward plenum chambers associated with said first and second tray conveyor runs and a pair of valve controlled return duct means each selectively providing communication between the intake of said fourth fan means and one or the other of the upper and lower rearward plenum chambers associated with said respective first and second tray conveyor runs for selectively recirculating oven atmosphere upwardly or downwardly through the rearward baking zones associated with said first and second tray conveyor runs, fifth fan means, blowing duct means providing communication between the discharge of said fifth fan means and the lower rearward plenum chamber associated with said fourth tray conveyor run and return duct means providing communication between the intake of said fifth fan means and the upper rearward plenum chamber associated with said third tray conveyor run for recirculating oven atmosphere upwardly through the rearward baking zones associated with said third and fourth tray conveyor runs.

8. A construction in accordance with claim 7 including a pair of transversely elongated blowdown ducts spaced apart lengthwise of the oven and extending from one side to the other thereof, each of said blowdown ducts being disposed between and in spaced relation with respect to said third and fourth tray conveyor runs and having apertures directed toward said fourth tray conveyor run, one of said blowdown ducts communicating with the blowing duct associated with said third fan means and the other of said blowdown ducts communicating with the blowing duct associated with said fifth fan means, and valve means in each of said last named blowing ducts for controlling the relative amounts of recirculated oven atmosphere delivered to said blowdown ducts and the forward and rearward lower plenum chambers associated with said fourth tray conveyor run.

References Cited
UNITED STATES PATENTS

| | | | |
|---|---|---|---|
| 2,002,976 | 5/1935 | Byron | 107—55 |
| 2,220,718 | 11/1940 | Holm | 107—57 |
| 3,173,384 | 3/1965 | Dersch et al. | 107—57 |

WALTER A. SCHEEL, *Primary Examiner.*

J. SHEA, *Assistant Examiner.*